E. A. EASON.
PLANTER.
APPLICATION FILED JAN. 7, 1910.
992,553.
Patented May 16, 1911.
2 SHEETS—SHEET 1.
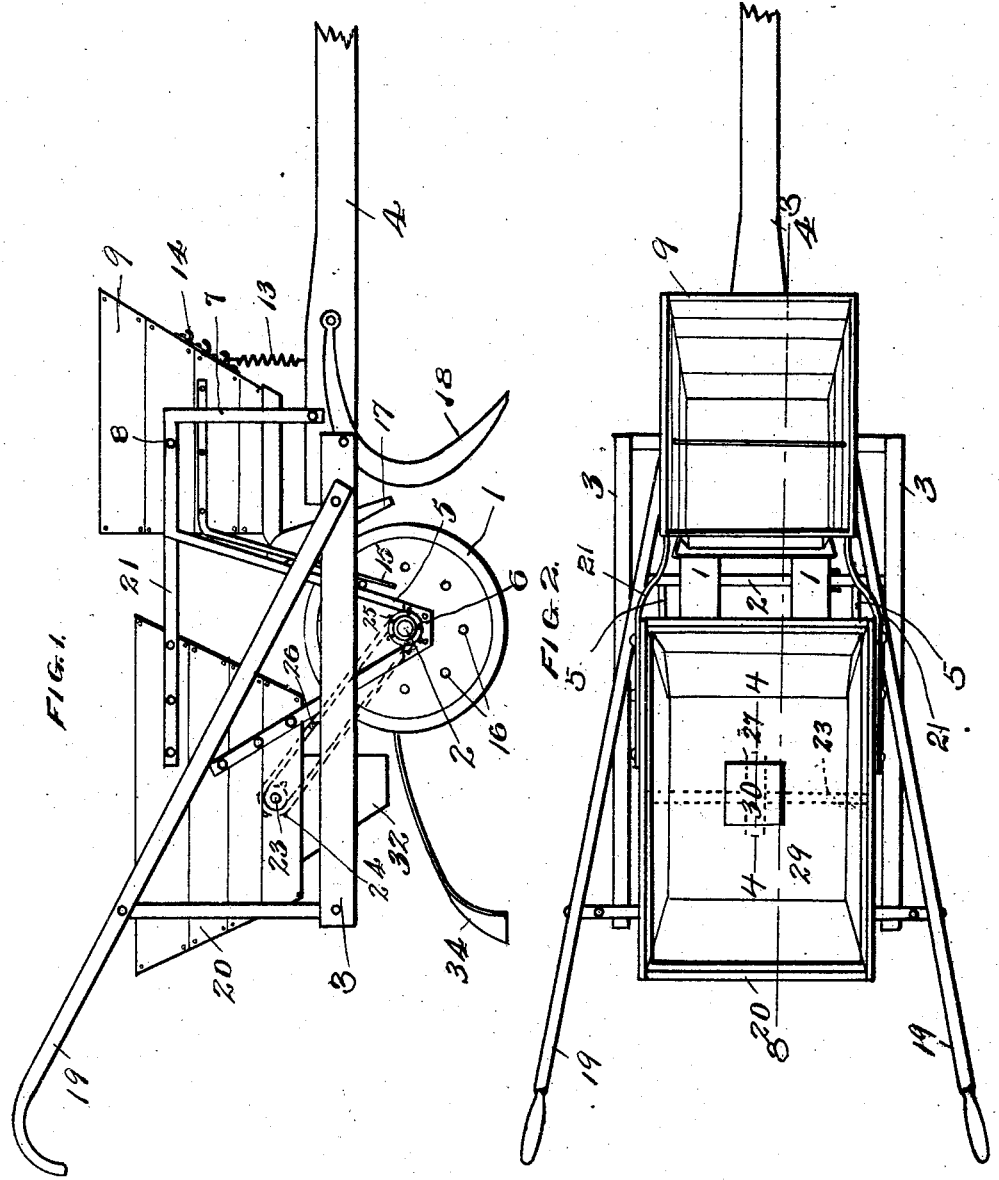
Witnesses
C. K. Davis
M. E. Moore
Elbert A. Eason
Inventor
By Wm. N. Moore
Attorney E. A. EASON.
PLANTER.
APPLICATION FILED JAN. 7, 1910.
992,553.
Patented May 16, 1911.
2 SHEETS—SHEET 2.
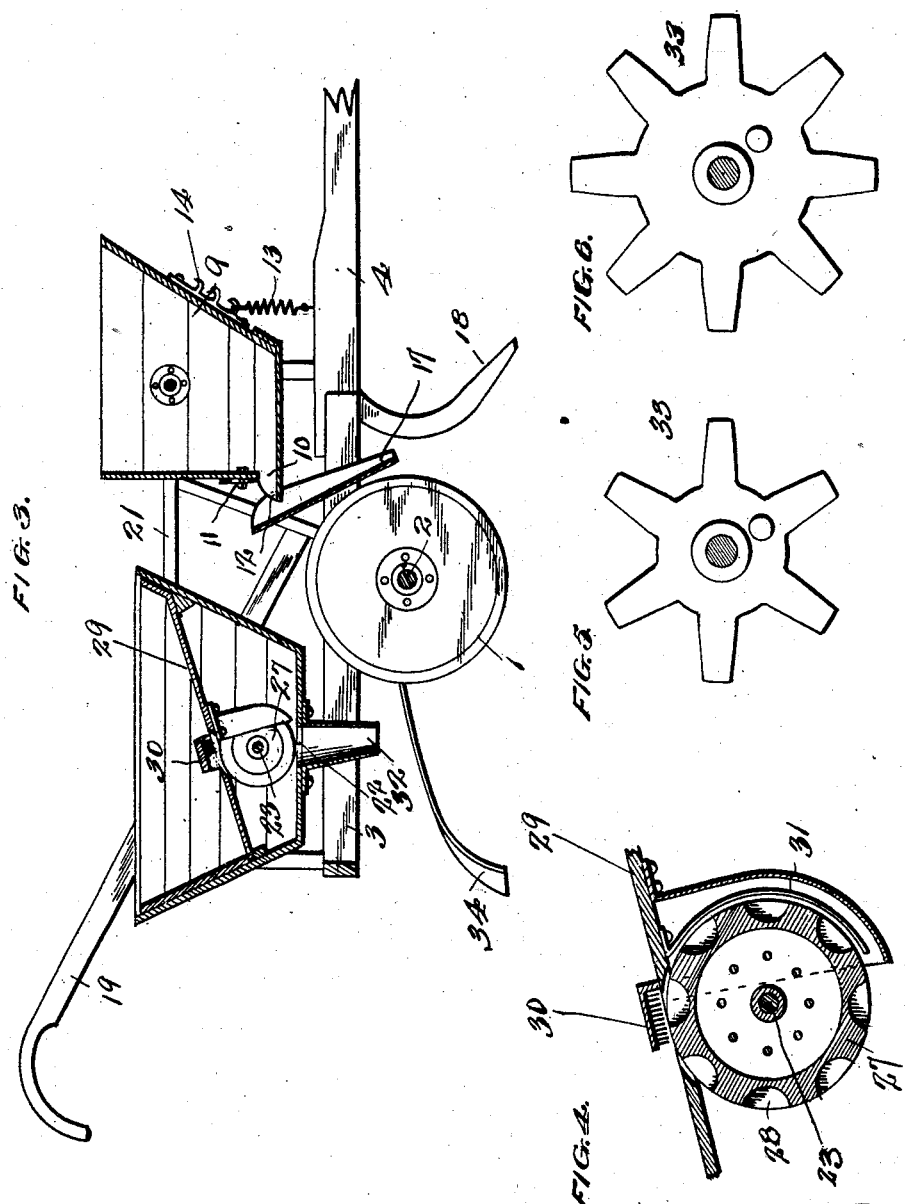

UNITED STATES PATENT OFFICE.

ELBERT A. EASON, OF BOWDON, GEORGIA.

PLANTER.

992,553.　　　　Specification of Letters Patent.　　Patented May 16, 1911.

Application filed January 7, 1910. Serial No. 536,818.

*To all whom it may concern:*

Be it known that I, ELBERT A. EASON, a citizen of the United States, residing at Bowdon, in the county of Carroll and State of Georgia, have invented certain new and useful Improvements in Planters, of which the following is a specification.

My invention relates to improvements in planters, and the leading object of my invention is the provision of a planter which can be readily adapted to feed various kinds of seeds.

A further object of the invention is the provision in combination with a planter, of means for forming a furrow in advance of the seed and for closing the furrow after the seed has been deposited therein.

A further object of my invention is the provision of fertilizer supplying mechanism located intermediate the furrow forming and seed distributing means, said fertilizing mechanism being adapted to deposit fertilizer in the furrow to provide a rich bed for the seed which will insure its development into strong healthy plants.

With these and other objects of a similar character as hereinafter disclosed in view, my invention consists in a planter embodying novel features of construction and combination and arrangement of parts for service substantially as described and as illustrated in the accompanying drawings which show one of the physical embodiments of the principles of my invention.

Figure 1 represents a side elevation of the complete device. Fig. 2 represents a top plan view thereof. Fig. 3 represents a longitudinal sectional view of the complete planter on line 3—3 of Fig. 2. Fig. 4 represents an enlarged sectional view of the corn feeding mechanism, on line 4—4 of Fig. 2, and Figs. 5 and 6 represent side elevations of feed wheels adapted for use in planting cotton and oats, respectively.

In the drawings, in which similar characters of reference denote corresponding parts in the several views, the numeral 1 designates the supporting wheels of the device, said wheels being mounted on the shaft or axle 2, while supported by the axle is the rectangular frame 3 provided at its front end with the beam or draft bar 4. To support the frame 3 I employ the V-shaped rods 5, suitable journals for the axle 2 being provided at 6, the point of the V, while the frame is secured to the plates intermediate their length, the plates projecting upward therefrom, as will be understood by reference to Fig. 1. It will be observed from this figure that the forward leg of the V is bent forward and then reversely downward toward the frame and is secured thereto, providing the bracket 7.

Pivotally secured between the opposite brackets 7 through the medium of the pins or spindle 8 is the flaring fertilizer container 9, said container having a slot 10 formed in its bottom and being provided with a slide or gage member 11 for regulating the width of said slot, the bottom of the box being formed into a spout 12 which extends under the slot and projects rearwardly from the container.

To retain the fertilizer container in upright position and prevent it from swinging on its pivot and dumping out its entire contents at one time, I secure to the beam the coil spring 13, while on the front of the container I provide the hooks or other suitable means 14 for adjustably securing the spring to the container. To rock the container and cause it to deposit a small amount of fertilizer along the furrow, I provide the lever arm 15 having one end secured to the container and the other extending downward therefrom and substantially parallel to the adjacent leg of the V-shaped support 5, said lever 15 extending partly across one side of one of the wheels 1 of the device and being held by the action of the spring 13 in position where it will be contacted with by the abutments or pins 16 carried by one of the wheels, said contact serving to rock the container and spout downward, the further movement of the wheel serving to move the abutment out of engagement with the lever, when the spring moves the container back into position, the contact of the lever with the next abutment limiting the reverse movement of the container and stopping the same with a jerk which will throw a portion of the fertilizer out through the slot and spout, a suitable chute 17 being carried by the frame and receiving the fertilizer from the spout and delivering it to the furrow, said furrow being preferably formed by the share 18 secured to the beam in advance of the container.

Secured to and extending rearwardly from the frame are the guiding handles 19, while mounted on the rear of the frame and rigidly secured in position thereon is the seed hopper 20, said hopper being secured to the rear leg of the support 5 and having a brace 21 secured to each side and extending forward and secured to the bracket 7. The hopper 20 has flaring sides and is provided with a slot 22 in its bottom, a shaft 23 being journaled in the sides of the hopper directly above the slot and having one end projecting therefrom, said end bearing a sprocket wheel 24 operatively connected with a sprocket 25 carried by one of the wheels 1 through the medium of the chain 26.

Secured to the shaft 23 in any suitable manner is a cast wheel 27 having a series of peripheral pockets or recesses 28 formed therein and adapted to receive corn, peas or like seed. In the use of said wheel, I introduce into the hopper an auxiliary or false hopper 29 in which the seed is placed, said hopper 29 resting above the cast wheel and having a slot affording communication therewith.

In operation, as the device is moved, the revolution of the wheels 1 will cause a like revolution of the cast wheel, and as the wheel revolves, the seed resting thereon will be received in the peripheral pockets 28, while to prevent excess of grain from being carried around on the wheel, I secure at the front edge of the slot in the auxiliary hopper the brush member 30, said member serving to prevent any seed except that entirely contained in the pockets from being carried around with the wheel, while to retain the seed in the pockets during the revolution of the wheel until they have been carried into the discharge slot 22, I employ the spring member 31, said blade spring being carried by the under side of the false hopper and curving around in close engagement with the periphery of the cast wheel and retaining the contents of the pockets in position until said pockets have passed the spring and are in alinement with the slot in the hopper, the seed then falling through the slot and being guided by the chute or spout 32 into the furrow.

It will be understood that the above described operation of feeding the seed from the hopper is adapted for use only with corn and like larger grains, but to feed cotton, oats or like seed I employ the form of wheel shown in Figs. 5 and 6. When it is desired to plant said smaller seed, I remove the false hopper 29, thus taking with it the blade spring and the restraining brush member, and I remove the cast wheel 27 from the shaft 23 and substitute in place thereof one of the toothed wheels 33, the number of teeth on the wheel serving to regulate the rapidity at which the seed is fed, as will be readily understood.

To close the furrow after the seed has been fed therein supplied with fertilizer, I secure to the rear of the frame a suitable number of scrapers 34 which throw or scrape the furrow together and close up the ground over the seed.

From the foregoing description taken in connection with the drawings, the construction and operation of my device will be readily understood and its advantages fully appreciated, and it will be seen that I provide a strong, simple and durable combined plow and furrow former, fertilizer distributer, planter and coverer, and that the distribution of the fertilizer is readily controlled, both by the regulation of the force of the jerk or knock caused by the reverse swinging of the hopper, said regulation being through the adjustment of the spring, while the amount can also be regulated by the gage or slide, and that I provide a device adapted to plant a great variety of grains.

I claim:

1. The combined planter and fertilizer distributer herein shown and described, comprising a pair of side bars, transversely disposed frame bars connecting the side bars, a tongue secured to the front of the frame thus formed, handle members secured to the side bars and extending rearwardly therefrom, brace members secured to the rear of the side bars and to the handles for bracing the latter, a bar having a V-shaped portion secured intermediate the length of its arms to the side bar on each side, bearings secured in the points of the V's, a hopper immovably secured to the rear arms of the bar, the front arms of the bar having a horizontal forwardly extending portion terminating in a vertical arm extending downward and secured to the frame, braces on each side secured to the horizontal portion of the bar and to the hopper, a spindle having its ends secured to the said horizontal portions of the bars, a fertilizer container pivotally mounted on the spindle, a rod secured to the container and extending downward along the front arm of the V, an axle journaled in the bearings at the point of the V, supporting wheels mounted on the axle, one of said wheels bearing laterally projecting abutments contacting with the rod to rock the container on its spindle to discharge the fertilizer, and an adjustable spring for returning the container to initial position when so rocked.

2. An implement as described composed of the frame, a tongue, a furrow opener connected to the frame, vertical supports on the rear of the frame and a seed hopper mounted therebetween and provided with a seed feeder, a fertilizer hopper, a pair of angle brackets pivotally connecting the fertilizer hopper with the frame, V-shaped brackets connected with the hopper and angle brackets of the fertilizer frame and provided with short bearings in the V-shaped portions, a wheel having its shaft mounted in said bearings of the brackets, a sprocket wheel on the wheel shaft, seed feeding means mounted on said shaft, a sprocket on the seed feeding means, a sprocket chain connecting the sprockets and transmitting movement from the wheel to the said feeding means, pins or tappets projecting laterally from said wheel, a depending arm leading from the fertilizer hopper adapted to be struck by said pins to agitate the hopper, spring means for returning the hopper to normal position, and a coverer or furrow closer arranged in the rear of the wheel.

In testimony whereof I affix my signature, in presence of two witnesses.

ELBERT A. EASON.

Witnesses:
 J. J. HARN,
 HENRY JOHNSON.

Copies of this patent may be obtained for five cents each, by addressing the "Commissioner of Patents, Washington, D. C."